(12) United States Patent
Konishi et al.

(10) Patent No.: US 9,813,280 B2
(45) Date of Patent: Nov. 7, 2017

(54) LIKELIHOOD GENERATION APPARATUS AND METHOD THEREFOR

(71) Applicant: MITSUBISHI ELECTRIC CORPORATION, Chiyoda-ku (JP)

(72) Inventors: Yoshiaki Konishi, Chiyoda-ku (JP); Kenya Sugihara, Chiyoda-ku (JP); Yoshikuni Miyata, Chiyoda-ku (JP); Hideo Yoshida, Chiyoda-ku (JP); Kazuo Kubo, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/112,652

(22) PCT Filed: Feb. 16, 2015

(86) PCT No.: PCT/JP2015/054107
§ 371 (c)(1),
(2) Date: Jul. 19, 2016

(87) PCT Pub. No.: WO2015/137049
PCT Pub. Date: Sep. 17, 2015

(65) Prior Publication Data
US 2016/0344580 A1    Nov. 24, 2016

(30) Foreign Application Priority Data
Mar. 13, 2014    (JP) .................. 2014-049846

(51) Int. Cl.
*H04L 27/34* (2006.01)
*H04L 27/38* (2006.01)

(52) U.S. Cl.
CPC .......... *H04L 27/3483* (2013.01); *H04L 27/38* (2013.01)

(58) Field of Classification Search
CPC ........................... H04L 27/3483; H04L 27/38
See application file for complete search history.

(56) References Cited

U.S. PATENT DOCUMENTS

| 6,226,333 B1 | 5/2001 | Spalink |
| 7,764,712 B2 * | 7/2010 | Yoshii .................. H04L 1/0606 370/491 |

(Continued)

FOREIGN PATENT DOCUMENTS

| CN | 101406019 A | 4/2009 |
| JP | 11-146027 A | 5/1999 |

(Continued)

OTHER PUBLICATIONS

PCT Written Opinion of the International Searching Authority dated Mar. 31, 2015, in PCT/JP2015/054107, 5 pages.

(Continued)

*Primary Examiner* — Phuc Tran
(74) *Attorney, Agent, or Firm* — Oblon, McClelland, Maier & Neustadt, L.L.P.

(57) ABSTRACT

A likelihood generation apparatus for acquiring a likelihood of a 16QAM signal includes a first likelihood generation unit configured to generate a likelihood of each of two bits of a 16QAM signal point of the 16QAM signal from a relationship of each of an I-axis component and a Q-axis component with a likelihood when the 16QAM signal point is mapped on a constellation diagram, and a second likelihood generation unit configured to generate a likelihood of each of remaining two bits other than the two bits of the 16QAM signal point of the 16QAM signal based on a position of the 16QAM signal point in a lookup table, which is configured to input the I-axis component and the Q-axis component of the 16QAM signal point as arguments, and includes regions (Continued)

acquired by dividing the constellation diagram based on a possible value of each of the bits.

8 Claims, 9 Drawing Sheets

(56) References Cited

U.S. PATENT DOCUMENTS

| | | | | |
|---|---|---|---|---|
| 8,718,204 | B1* | 5/2014 | Lee | H04L 25/03203 |
| | | | | 375/262 |
| 9,203,558 | B1* | 12/2015 | Dave | H04L 1/0054 |
| 2006/0212776 | A1 | 9/2006 | Koslov et al. | |
| 2007/0217536 | A1 | 9/2007 | Choi | |
| 2007/0263712 | A1* | 11/2007 | Ling | H04L 1/20 |
| | | | | 375/227 |
| 2009/0003466 | A1* | 1/2009 | Taherzadehboroujeni | H04B 7/0669 |
| | | | | 375/260 |
| 2011/0038403 | A1* | 2/2011 | Ichihara | H04L 5/0046 |
| | | | | 375/222 |
| 2011/0075770 | A1 | 3/2011 | Seyama | |
| 2012/0033767 | A1* | 2/2012 | Wilborn | H04L 25/03184 |
| | | | | 375/341 |
| 2012/0069890 | A1* | 3/2012 | Igura | H03M 13/25 |
| | | | | 375/230 |
| 2012/0189082 | A1* | 7/2012 | Zhang | H04B 7/0452 |
| | | | | 375/299 |
| 2012/0300691 | A1* | 11/2012 | Chao | H04L 5/0044 |
| | | | | 370/312 |
| 2013/0170535 | A1* | 7/2013 | Atungsiri | H04L 27/3488 |
| | | | | 375/229 |
| 2013/0287150 | A1* | 10/2013 | Jung | H04L 5/0023 |
| | | | | 375/341 |
| 2015/0110205 | A1* | 4/2015 | Jin | H04L 1/0054 |
| | | | | 375/257 |
| 2017/0126301 | A1* | 5/2017 | Taherzadehboroujeni | H04B 7/0669 |

FOREIGN PATENT DOCUMENTS

| | | |
|---|---|---|
| JP | 2004-32125 A | 1/2004 |
| JP | 2004-260712 A | 9/2004 |
| JP | 2006-527532 A | 11/2006 |
| JP | 2011-77940 A | 4/2011 |
| JP | 5397469 B2 | 1/2014 |

OTHER PUBLICATIONS

International Search Report dated Mar. 31, 2015, in PCT/JP15/054107 Filed Feb. 16, 2015.

Sugihara, et al., "A Simplified LLR Computation Algorithm for Differentially Encoded QAM," IEICE, 2014 (2 Pages).

Office Action dated Feb. 16, 2017 in Chinese Patent Application No. 201580010796.1 (with English translation).

* cited by examiner

FIG. 2

```
                          Q AXIS           BIT ASSIGNMENT AT
                                           EACH SIGNAL POINT:
   {1000}   {1001}  │  {0010}   {0000}     {b0, b1, b2, b3}
     ○        ○    │    ○        ○

{1010}   {1011}  │  {0011}   {0001}
     ○        ○    │    ○        ○
                                                I AXIS
   ─────────────────┼──────────────────────
   {1101}   {1111}  │  {0111}   {0110}
     ○        ○    │    ○        ○

LIKELIHOOD GENERATION APPARATUS AND METHOD THEREFOR

TECHNICAL FIELD

The present invention relates to a QAM modulation scheme in an optical transmission apparatus, and more particularly, to a likelihood generation apparatus and the like to be used for soft decision error correction.

BACKGROUND ART

In recent years, a bit rate required in an optical transmission system has been increasing. Moreover, as a result of the progress in the speed and the integration of an electronic device technology, a digital coherent scheme of carrying out synchronous detection of an optical signal can be achieved, and multi-level modulation/demodulation technologies such as quadrature phase-shift keying (QPSK) and 16-quadrature amplitude modulation (16QAM) are employed.

As compared to intensity modulated direct detection (IM-DD) and differential phase-shift keying (DPSK), which have hitherto been employed, the multi-level modulation/demodulation technologies such as the QPSK and the 16QAM have a short interval between signal points, and a higher signal noise ratio (SNR) is thus required in order to achieve an equivalent transmission distance and signal speed.

In order to compensate this insufficiency in the SNR, an error correction decoding scheme acquired by combining a strong error correction code, e.g., a low density parity check (LDPC) code, with soft decision decoding that also uses analog information on the signal is usually used. The soft decision decoding calculates likelihoods of bits assigned to a signal point of a received signal based on a position of the signal point, and carries out error correction.

Meanwhile, in the field of the wireless communication, the application of the multi-level modulation/demodulation technology has been in progress, and many communication standards such as the worldwide interoperability for microwave access (WiMAX) and the long term evolution (LTE) are established. In order to use the same apparatus and device to meet those standards, such a configuration that a likelihood calculation circuit is shared among a plurality of communication standards is conceivable.

For example, in Patent Literature 1, there is disclosed a method of applying, in the WiMAX and LTE, a simple rotation or inversion to a received signal to process a bit mapped to different signal points in the same likelihood generation circuit, to thereby decrease a required hardware amount.

CITATION LIST

Patent Literature

[PTL 1] JP 5397469 B

SUMMARY OF INVENTION

Technical Problem

In the optical communication system, the baseband frequency extends up to several tens of gigabits, and a gate scale required for an integrated circuit thus reaches several million gates as a whole. Therefore, the circuit sharing is essential. For example, there is known a method involving sharing a circuit relatively small in a processing amount, which is to be used for the likelihood generation for two bits assigned to the in-phase (I) axis and the quadrature (Q) axis of the QPSK, with the likelihood generation for two sets of two bits of the 16QAM.

However, there is a problem in that an error is caused in the soft decision for the two bits of the 16QAM with an approximation by the soft decision for the QPSK depending on a method of assigning bits, and thus a desired performance, namely, a desired precision of the likelihood, cannot be acquired.

It is an object of the present invention to provide a likelihood generation apparatus and the like for solving the problem of the decrease in the precision of the likelihood due to the error caused by the likelihood generation approximation when the circuit scale is reduced in the likelihood generation of the multi-level QAM, e.g., the 16QAM, and further, solving a problem of degradation in an error correction performance, for example, in such a configuration that a soft decision error correction unit is provided at a subsequent stage of the likelihood generation apparatus.

Solution to Problem

According to one embodiment of the present invention, there is provided a likelihood generation apparatus for acquiring a likelihood of a 16QAM signal, the likelihood generation apparatus including: a first likelihood generation unit configured to generate a likelihood of each of two bits of each of 16QAM signal points of the 16QAM signal from a relationship of each of an I-axis component and a Q-axis component with a likelihood when the each of the 16QAM signal points is mapped on a constellation diagram; and a second likelihood generation unit configured to generate a likelihood of each of remaining two bits other than the two bits of the each of the 16QAM signal points of the 16QAM signal based on a position of the each of the 16QAM signal points in a lookup table, which is configured to input the I-axis component and the Q-axis component of the each of the 16QAM signal points as arguments, and includes regions acquired by dividing the constellation diagram based on a possible value of each of the bits.

The present invention can provide the likelihood generation apparatus and the like having suppressed degradation of the precision of the likelihood while suppressing the circuit scale. As a result, for example, an optical transmission apparatus having an increased transmission distance and bit rate can be achieved.

DESCRIPTION OF EMBODIMENTS

Now, a likelihood generation circuit and the like according to each of embodiments of the present invention are described with reference to the drawings. In each of the embodiments, the same or corresponding portions are denoted by the same reference symbols, and the overlapping description thereof is omitted.

First Embodiment

Figure 1:
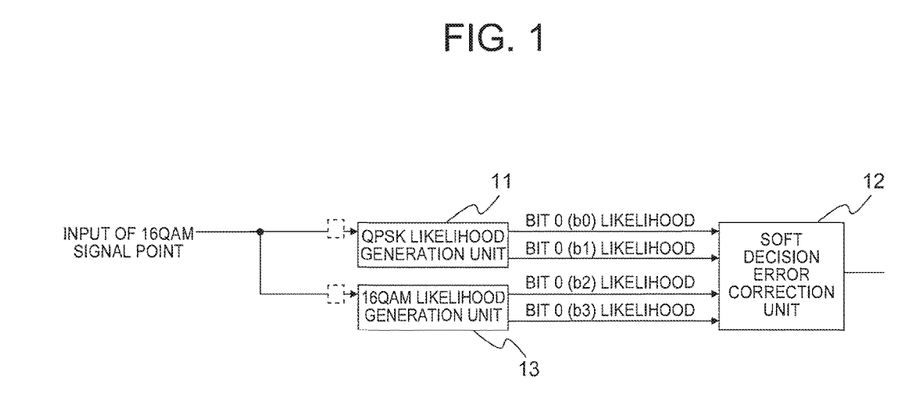
FIG. 1 is a schematic configuration diagram for illustrating a likelihood generation apparatus according to a first embodiment of the present invention including a soft decision error correction unit provided at a subsequent stage of the likelihood generation apparatus.

FIG. 1 is a schematic configuration diagram for illustrating a likelihood generation apparatus according to a first embodiment of the present invention including a soft decision error correction unit provided at a subsequent stage of the likelihood generation apparatus. A QPSK likelihood generation unit 11 is configured to input a signal point of a received 16QAM signal, calculate likelihoods of a bit 0 (b0) and a bit 1 (b1), and output the likelihoods to a soft decision error correction unit 12. A 16QAM likelihood generation unit 13 is a look-up table (LUT) configured to input the signal point of the 16QAM signal received in the same way, calculate likelihoods of a bit 2 (b2) and a bit 3 (b2), and output the likelihoods to the soft decision error correction unit 12.

In FIG. 1, the signal point of the 16QAM signal is illustrated to be directly input. Detection of the signal point of the 16QAM signal may be carried out by respectively providing signal point detection units as indicated by the broken lines (refer to FIG. 1, FIG. 6, and FIG. 8) on input sides of the QPSK likelihood generation unit 11 and the 16QAM likelihood generation unit 13. Moreover, the QPSK likelihood generation unit 11 and the 16QAM likelihood generation unit 13 may respectively include the signal point detection units (the same applies to the following).

Figure 2:
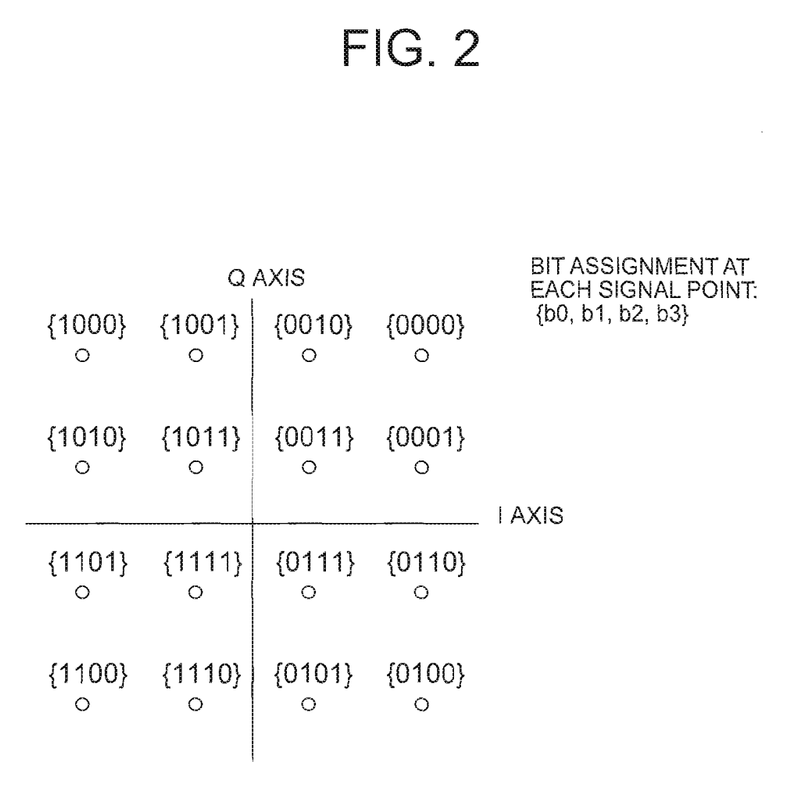
FIG. 2 is a constellation diagram for showing a bit assignment to signal points of a 16QAM signal.

FIG. 2 is a constellation diagram for showing a relationship between signal points of the 16QAM signal and assigned bits. The bit assignment of each of the signal points is represented as bits {b0, b1, b2, b3} of FIG. 1.

Figure 3:
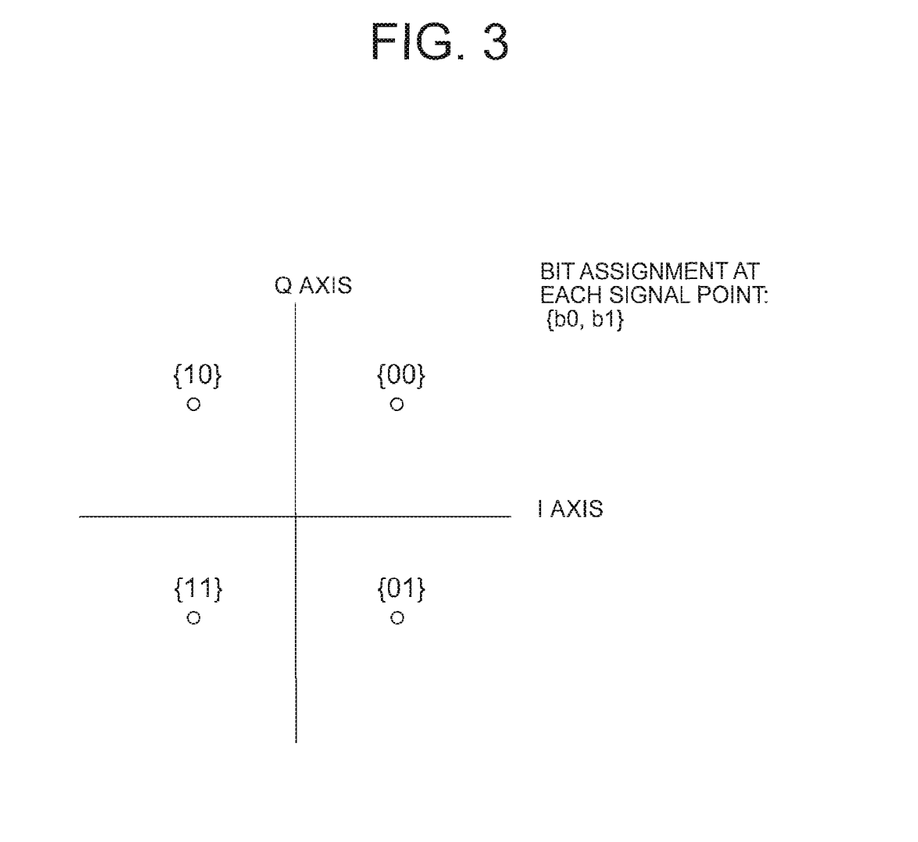
FIG. 3 is a constellation diagram for showing a bit assignment to signal points of a QPSK signal.
Figure 4:
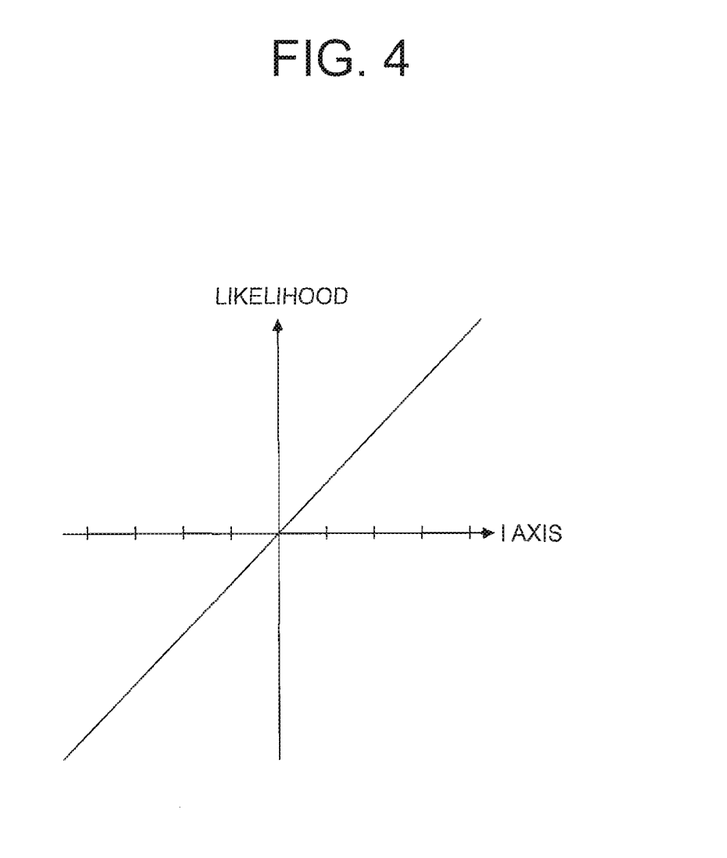
FIG. 4 is a graph for showing a relationship between an I axis and a likelihood value in the QPSK according to the present invention.

FIG. 3 is a constellation diagram for showing a relationship between signal points of a general QPSK and assigned bits. The bit assignment of each of the signal points is represented as bits {b0, b1} of FIG. 1. Moreover, FIG. 4 is a graph for showing a relationship between, for example, the I (in-phase) axis of the QPSK and the likelihood value. As shown in FIG. 3, the bit is determined to be 1 or 0 with respect to the I (in-phase) axis or the Q (quadrature) axis in the QPSK. As a result, as shown in FIG. 4, the likelihood can be calculated only based on the I axis component or the Q axis component (FIG. 4 is a graph for showing the case of the I axis). As shown in FIG. 2, b0 is assigned to the I axis, and b1 is assigned to the Q axis also on the constellation diagram of the 16QAM, which is the same as the assignment of the QPSK, and thus those bits can be calculated by the QPSK likelihood generation unit 11 using a simple circuit.

Figure 5:
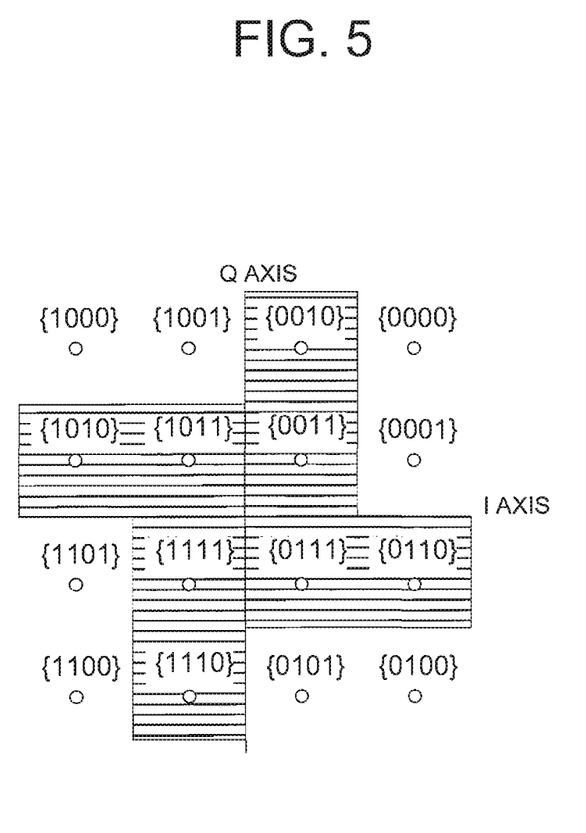
FIG. 5 is a diagram for illustrating regions in which a bit 2 is determined to be 1 in the constellation diagram of the 16QAM according to the present invention.

The 16QAM likelihood generation unit 13 is constructed by LUTs, and is configured to input the I axis coordinates and the Q axis coordinates of the input signal points as arguments to calculate the likelihoods. In FIG. 5, regions in which b2 is determined to be 1 are represented by hatching. Those regions are distributed on the two dimensional constellation diagram, and the 16QAM likelihood generation unit 13 cannot thus be constructed by a simple circuit as for the QPSK likelihood generation. In this embodiment, the LUTs can be used to output optimal likelihoods for all the coordinates.

In other words, the QPSR likelihood generation unit 11, which is a first likelihood generation unit, is configured to generate a likelihood of each of two bits of the 16QAM signal point of the 16QAM signal from the relationship of each of the I-axis component and the Q-axis component with the likelihood when the signal point is mapped on the constellation diagram.

The 16QAM likelihood generation unit 13, which is a second likelihood generation unit, is configured to generate a likelihood of each of remaining two bits other than the first two bits of the 16QAM signal point of the 16QAM signal based on a position of the signal point in a lookup table, which is configured to input the I-axis component and the Q-axis component of the signal point as arguments, and includes regions acquired by dividing the constellation diagram based on a possible value of each of the bits.

In this embodiment, accuracies of the likelihoods can be maintained while the circuit scale is suppressed by sharing a part of the likelihood generation circuit (13) for the 16QAM with the QPSK likelihood generation circuit. Moreover, for example, such an effect is provided that an error correction decoding performance is not degraded in a configuration in which a soft decision error correction unit is provided at a subsequent stage of the likelihood generation apparatus.

Second Embodiment

Figure 6:
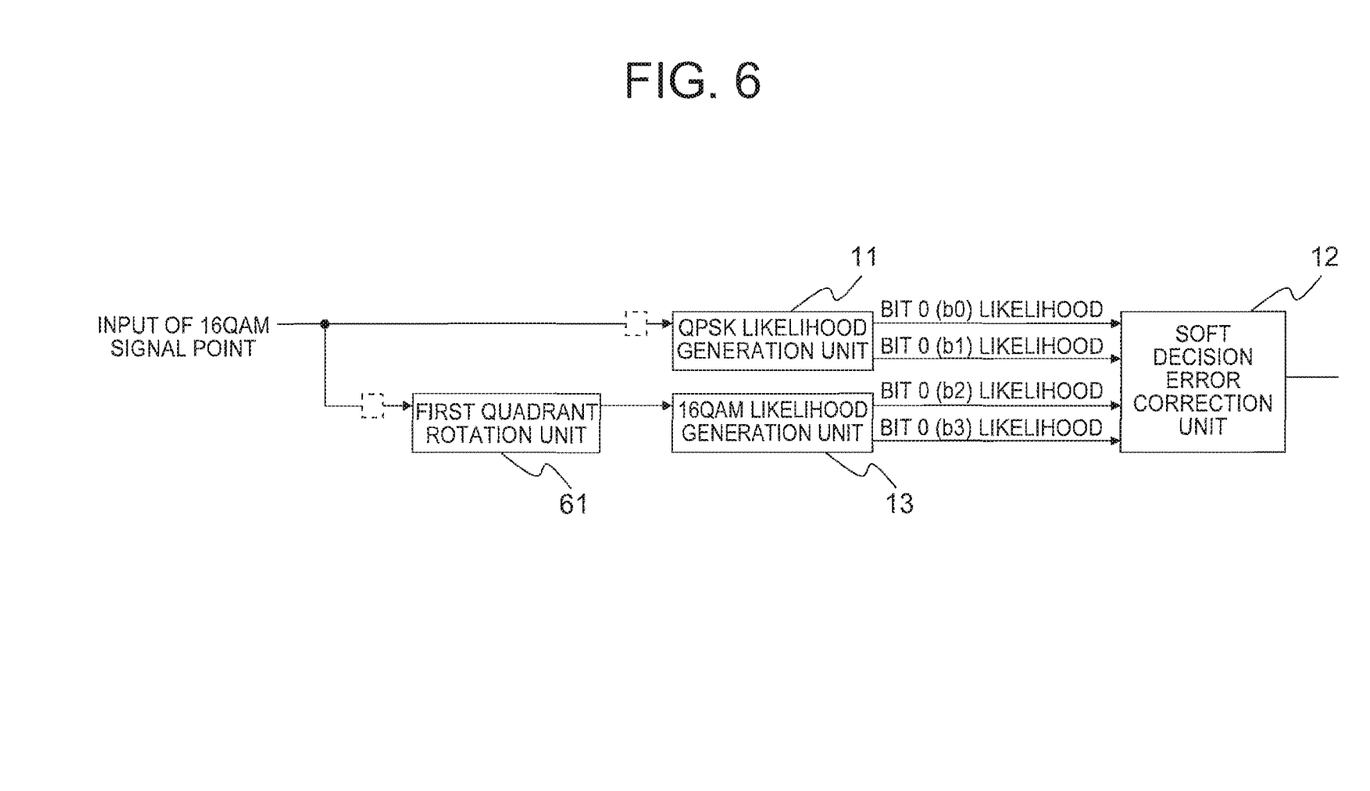
FIG. 6 is a schematic configuration diagram for illustrating a likelihood generation apparatus according to a second embodiment of the present invention including a soft decision error correction unit provided at a subsequent stage of the likelihood generation apparatus.

FIG. 6 is a schematic configuration diagram for illustrating a likelihood generation apparatus according to a second embodiment of the present invention including a soft decision error correction unit provided at a subsequent stage of the likelihood generation apparatus. In FIG. 6, the first quadrant rotation unit 61 is configured to, through an input of a quadrant in which a signal point of a 16QAM signal exists:

when the signal point exists in the first quadrant, pass the signal point;

when the signal point exists in the second quadrant, invert the I axis, and then switch between the I axis and the Q axis;

when the signal point exists in the third quadrant, inverts the I axis and the Q axis; and when the signal point exists in the fourth quadrant, invert the Q axis, and then switch between the I axis and the Q axis, and output the signal point to the 16QAM likelihood generation unit 13.

Figure 7A:
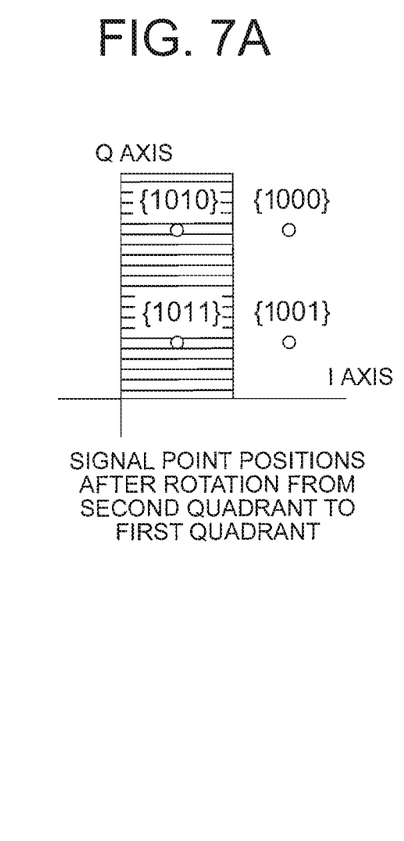
FIGS. 7A, 7B and 7C are diagrams each for illustrating a bit assignment after a rotation to the first quadrant according to the present invention.
Figure 7B:
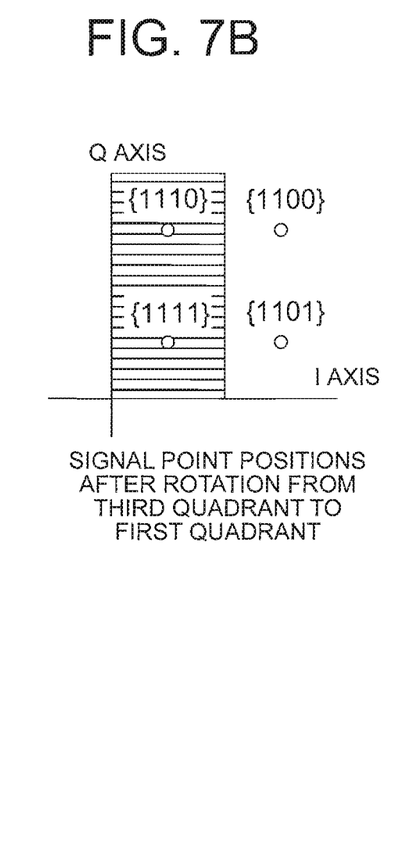
Figure 7C:
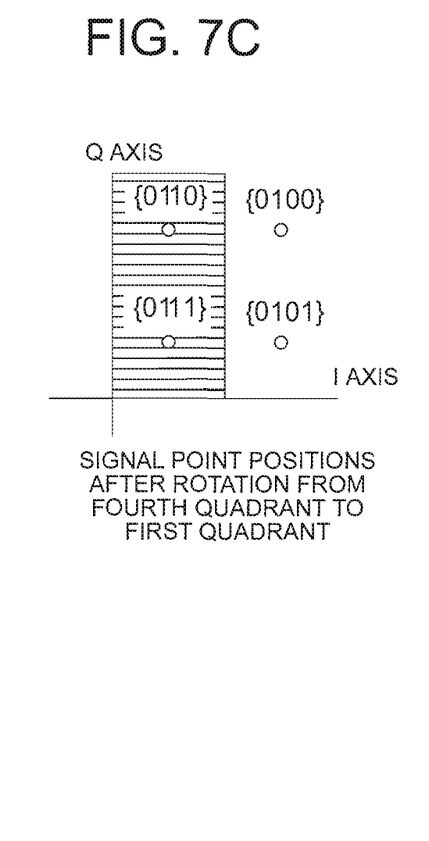

FIGS. 7A, 7B and 7C are diagrams each for illustrating the positions of the respective signal points in the first quadrant after the rotation to the first quadrant. FIG. 7A is a diagram for illustrating the signal point positions that previously existed in the second quadrant, and then underwent the inversion of the I axis and the subsequent switching between the I axis and the Q axis, namely, the rotation from the second quadrant to the first quadrant. FIG. 7B is a diagram for illustrating the signal point positions that previously existed in the third quadrant, and then underwent the inversion of the I axis and the Q axis, namely, the rotation from the third quadrant to the first quadrant. FIG. 7C is a diagram for illustrating the signal point positions that previously existed in the fourth quadrant, and then underwent the inversion of the Q axis and the subsequent switching between the I axis and the Q axis, namely, the rotation from the fourth quadrant to the first quadrant.

Moreover, the hatched portions represent regions in which b2 is determined to be 1. The positions of b2 and b3 after the rotation from each of the quadrants match. The regions of the b2s and b3s existing in the neighboring quadrants before the rotation are the same, and thus, the same LUT can be used. The coordinates of both the I axis and the Q axis after the rotation are limited to values equal to or more than 0, and thus, the required number of arguments of the LUT is suppressed to one quarter.

This embodiment provides an effect of further suppressing the scale of the LUTs required for the likelihood generation circuit (13) for the 16QAM.

Third Embodiment

Figure 8:
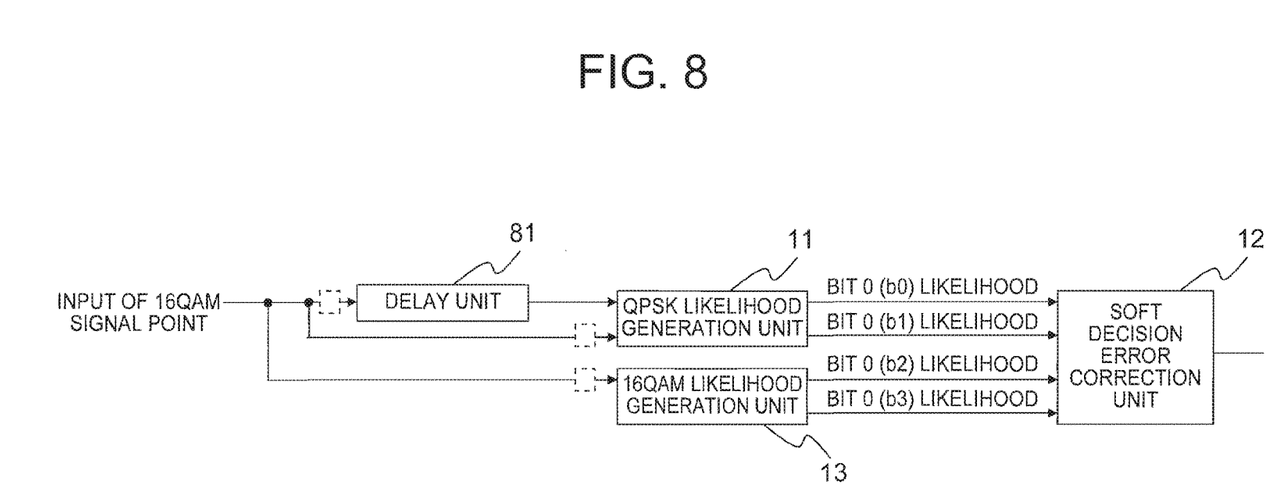
FIG. 8 is a schematic configuration diagram for illustrating a likelihood generation apparatus according to a third embodiment of the present invention including a soft decision error correction unit provided at a subsequent stage of the likelihood generation device.

FIG. 8 is a schematic configuration diagram for illustrating a likelihood generation apparatus according to a third embodiment of the present invention including a soft decision error correction unit provided at a subsequent stage of the likelihood generation apparatus. In addition to the configuration of the first embodiment, a delay unit 81 is configured to hold the received 16QAM signal one symbol before, and output the held 16QAM signal to the QPSK likelihood generation unit 11.

Differential encoding of assigning a transmitted data sequence to a phase difference between the 16QAM signal one symbol before and the current symbol is carried out on an output side (encoding side) of the signal to this likelihood generation apparatus. The QPSK likelihood generation unit 11 is configured to input the current symbol and the data one symbol before, and use LUTs to calculate the likelihoods from a rotation amount of a symbol phase, that is, to carry out differential decoding.

This embodiment provides such an effect that 16QAM likelihood generation adapted to the differential encoding that maintains the precision of the likelihood and is tolerant against the phase slip can be carried out while the circuit scale is suppressed. Moreover, for example, such an effect is provided that an error correction decoding performance is not degraded in a configuration in which a soft decision error correction unit is provided at a subsequent stage of the likelihood generation apparatus.

The present invention can also be applied to an optical communication apparatus employing the multi-level modulation/demodulation scheme requiring a bit rate equal to or more than 100 G/s.

The above description is given of a case in which the likelihood generation apparatus according to the present invention is constructed as the digital circuit. This digital circuit is constructed by, for example, one or more large-scale integration circuits (LSI circuits). Moreover, this digital circuit can be constructed by one or more field programmable gate arrays (FPGAs) and the like. Further, this digital circuit can be constructed by combining LSI circuits and FPGAs.

The 16QAM likelihood generation unit 13 can be constructed as LUTs of digital circuits. Moreover, a portion constructing the LUTs of the third embodiment of the QPSK likelihood generation unit 11 can be constructed by LUTs of digital circuits.

How to distribute the respective units illustrated in FIG. 1, FIG. 6, and FIG. 8 to form LSI circuits and FPGAs only needs to be determined depending on an application.

Figure 9:
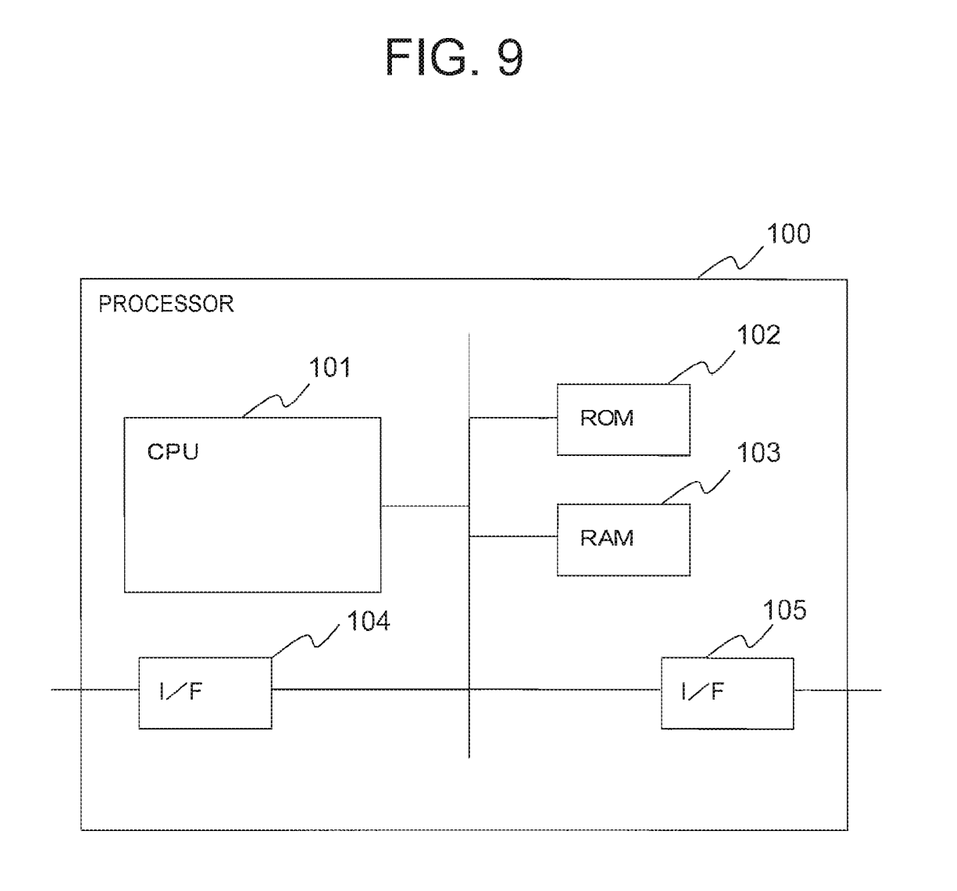
FIG. 9 is a schematic configuration diagram for illustrating a case in which the likelihood generation device is constructed by a processor according to the present invention.

Moreover, the likelihood generation apparatus according to the present invention may be constructed by a processor. A schematic configuration diagram in this case is illustrated in FIG. 9. FIG. 9 is a configuration diagram for illustrating a basic processor 100. A CPU 101 executes the above-mentioned signal processing and the like in accordance with programs stored in a nonvolatile ROM 102. Intermediate results of the signal processing and the like are temporarily stored in a volatile RAM 103. Then, the 16QAM signal or the 16QAM signal point is input via an interface (I/F) 104. Acquired likelihood signals are output to the soft decision error correction unit 12 via an interface (I/F) 105.

In this case, the respective functional units illustrated in FIG. 1, FIG. 6, and FIG. 8 represent functional blocks of the processing to be executed by the CPU 101 in accordance with the programs stored in the ROM 102. Moreover, the LUTs are, for example, stored in the ROM 102 in advance, and are referred to.

When the likelihood generation apparatus according to this invention is constructed by the processor in this way, the likelihood generation apparatus and the like configured to suppress the degradation in the precision of the likelihood while suppressing a calculation amount in place of the circuit scale can be provided. As a result, similarly, for example, an optical transmission apparatus having an increased transmission distance and bit rate can be achieved.

In general, the soft decision error correction unit 12 and the like are integrally constructed both in the case of the digital circuit and the case of the processor.

INDUSTRIAL APPLICABILITY

The likelihood generation apparatus according to the present invention can be applied to a likelihood generation apparatus configured to acquire the likelihood of the 16QAM signal in an optical transmission apparatus used in various fields.

REFERENCE SIGNS LIST

11 QPSK likelihood generation unit, 12 soft decision error correction unit, 13 16QAM likelihood generation unit, 61 first quadrant rotation unit, 81 delay unit, 100 processor, 101 CPU, 102 ROM, 103 RAM, 104, 105 interface (I/F)

The invention claimed is:

1. A likelihood generation apparatus for acquiring a likelihood of a 16-quadrature amplitude modulation (16QAM) signal, the likelihood generation apparatus comprising:

a first likelihood generation circuit configured to
generate a likelihood of each of two bits of each of 16QAM signal points of the 16QAM signal from a relationship of each of an I-axis component and a Q-axis component with a likelihood when each of the 16QAM signal points is mapped on a constellation diagram, and output the likelihood of each of two bits to a soft decision error correction circuit to perform error correction processing; and a second likelihood generation circuit configured to generate a likelihood of each of remaining two bits other than the two bits of each of the 16QAM signal points of the 16QAM signal based on a position of each of the 16QAM signal points in a lookup table, the lookup table including the I-axis component and the Q-axis component of each of the 16QAM signal points, and a mapping of regions acquired by dividing the constellation diagram based on a possible value of each of the bits, and output the likelihood for each of the remaining two bits to the soft decision error correction circuit to perform error correction processing.

2. The likelihood generation apparatus according to claim 1, further comprising a first quadrant rotation circuit provided on an input side of the second likelihood generation circuit, and configured to rotate each of the 16QAM signal points to a first quadrant of the constellation diagram.

3. The likelihood generation apparatus according to claim 2, wherein the first quadrant rotation circuit is further configured to pass a signal point through in response to the signal point being in the first quadrant.

4. The likelihood generation apparatus according to claim 2, wherein the first quadrant rotation circuit is further configured to invert the I-axis and then switch between the I-axis and the Q-axis in response to the signal point being in the second quadrant.

5. The likelihood generation apparatus according to claim 1, further comprising a delay circuit provided at an input of the first likelihood generation circuit, and configured to output a delayed reception signal to the first likelihood generation circuit, the reception signal being delayed by one symbol.

6. A likelihood generation method for acquiring a likelihood of a 16QAM signal, the likelihood generation method comprising:

generating a likelihood of each of two bits of each of 16QAM signal points of the 16QAM signal from a relationship of each of an 1-axis component and a Q-axis component with a likelihood when each of the 16QAM signal points is mapped on a constellation diagram;

generating a likelihood of each of remaining two bits other than the two bits of each of the 16QAM signal points of the 16QAM signal based on a position of each of the 16QAM signal points in a lookup table, the lookup table including the I-axis component and the Q-axis component of each of the 16QAM signal points, and a mapping of regions acquired by dividing the constellation diagram based on a possible value of each of the bits;

outputting the likelihood for each of two bits and each of the remaining two bits other than the two bits of each of the 16 QAM signal points; and performing an error correction of the output likelihood for each of the two bits and each of the remaining two bits.

7. The likelihood generation method according to claim 6, further comprising rotating each of the 16QAM signal points to a first quadrant of the constellation diagram when the likelihood of each of the remaining two bits other than the two bits is generated.

8. The likelihood generation method according to claim 6, further comprising applying differential decoding to each of the 16QAM signal points when the likelihood of each of the two bits of each of the 16QAM signal points is generated.

* * * * *